United States Patent [19]

Addy

[11] Patent Number: 5,074,652
[45] Date of Patent: Dec. 24, 1991

[54] GLASSES-ON BINOCULARS WITH AN EYEGLASS GUARD INCLUDING A GENERALLY OVULAR-SHAPED EYEGLASS LENS ENGAGING GENERALLY PLANAR SURFACE

[75] Inventor: Donald E. Addy, Leawood, Kans.

[73] Assignee: Jason Empire, Inc., Overland Park, Kans.

[21] Appl. No.: 681,048

[22] Filed: Apr. 5, 1991

[51] Int. Cl.⁵ .......................... G02B 23/18; G02B 7/04
[52] U.S. Cl. .................................... 359/600; 359/414; 359/418; 359/513
[58] Field of Search .............. 350/579, 552, 554, 555, 350/556, 589

[56] References Cited

U.S. PATENT DOCUMENTS

| | | |
|---|---|---|
| 1,668,975 | 5/1928 | Paulus et al. ..................... 350/579 |
| 2,271,380 | 1/1942 | Strang et al. . |
| 2,378,508 | 6/1945 | Smyth . |
| 2,381,101 | 8/1945 | Bausch . |
| 3,033,079 | 5/1962 | Haupt et al. . |
| 3,842,431 | 10/1974 | Sakuma .............................. 350/579 |
| 4,523,818 | 6/1985 | Lang . |
| 4,576,459 | 3/1986 | Miura et al. . |

FOREIGN PATENT DOCUMENTS

| | | | |
|---|---|---|---|
| 20185 | 9/1899 | Switzerland ....................... 350/579 |
| 132033 | 9/1919 | United Kingdom ................ 350/579 |

Primary Examiner—Jon W. Henry
Attorney, Agent, or Firm—Litman, McMahon & Brown

[57] ABSTRACT

A binocular or other optical viewing instrument dedicated for eyeglass-wearing users. An extended optical eye relief, as compared to binoculars for those without glasses, provides an eyeglass-wearing user with an optimal wide field of view. A pair of soft rubber eyeglass guards cushion the binocular against the user's eyeglasses, both protecting the eyeglass lenses and blocking a substantial portion of the ambient light from striking the eyeglass lenses.

13 Claims, 1 Drawing Sheet

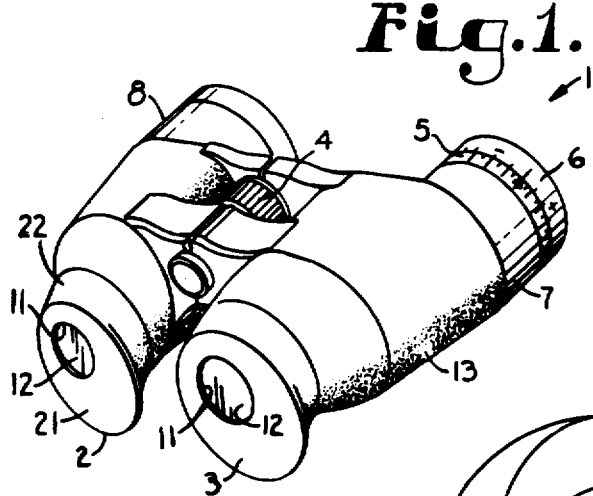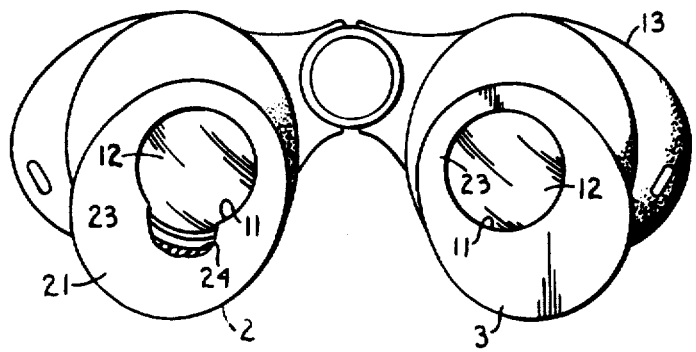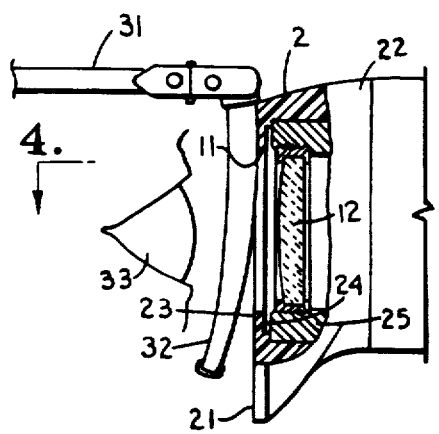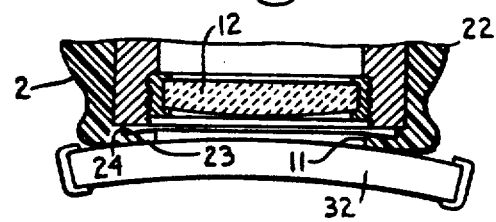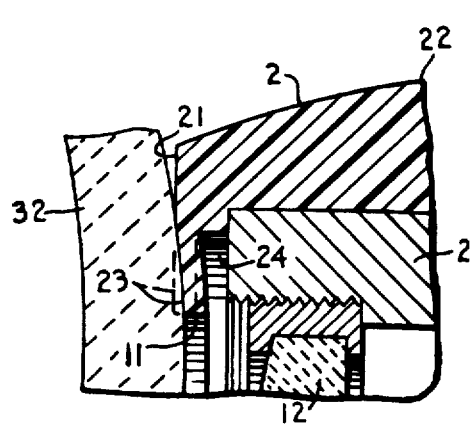

GLASSES-ON BINOCULARS WITH AN EYEGLASS GUARD INCLUDING A GENERALLY OVULAR-SHAPED EYEGLASS LENS ENGAGING GENERALLY PLANAR SURFACE

BACKGROUND OF THE INVENTION

The present invention relates to a binocular or other optical viewing instrument which is designed specifically for users who are wearing eyeglasses.

Traditionally, binoculars and other optical viewing instruments have been designed for non-eyeglass-wearing users. This has meant that the typical eye relief (the distance between the exit lens and the eyeball at which full field of view is achieved) has been designed to be approximately ten to twelve millimeters. When a user wearing eyeglasses or protective lenses attempts to use such an instrument, the eyeglass lens is necessarily superimposed between the viewer's eye and the exit lens of the optical instrument. This means that the eye relief distance of ten to twelve millimeters falls significantly short of the user's eye and the user's field of view is accordingly considerably reduced.

Previous attempts to adapt binoculars and other optical instruments for use by eyeglass wearers have proven to be inadequate compromises. One approach has been to place flexible eyecaps or eye pieces on the viewing end of the ocular tube or tubes of the instrument. These eyecaps have usually been made of a flexible material such as rubber or the like and designed to conform to a first extended condition for use by a non-eyeglass-wearing user, but which can be folded over to significantly reduce the axial length of the eyecap for use by an eyeglass-wearing user. While this approach significantly improved viewing conditions for eyeglass wearers, several problems remain. The repeated folding and unfolding of the resilient eyecaps has tended to stress and distort the material. Rubber or similar materials have tended to become brittle and cracked. This not only reduces the flexibility of the eyecap, but also can mar or scratch the eyeglass lenses. Furthermore, as the resilient material loses its elasticity, the axial length of the eyecap in both positions tends to change.

Another approach has been to provide an eyecap or eye piece which is telescopically mounted on the viewing end of the ocular tube of the instrument, but which is movable axially relative thereto so that the axial length of the eyecap is adjustable. Such eyecaps have used threaded mounts for adjustment or incorporated springs which urge the eyecap to normal extended axial length for use by a non-eyeglass wearer, but which can be compressed to reduce the axial length of the eyecap for an eyeglass-wearing user. In both instances, these mechanisms have tended to increase the weight and complexity of the optical instruments, and therefore the cost and difficulty of manufacture. In the case of the spring-mount, the requirement for an eyeglass user to place a constant force against the spring-urged eyecap has significantly increased the fatigue level of an eyeglass-wearing user. In the case of either the folding rubber eyecap or the spring-loaded, axially adjustable eyecap, if a user is jostled or merely lowers his arms to rest for a moment, the axial length of the eyecap can change, necessitating constant adjustment and resultant frustration and fatigue.

As previously mentioned, these approaches have represented compromises at best, and have failed to address the fundamental problem that typical binoculars or other optical viewing instruments are designed with an eye relief intended for the non-eyeglass wearer. It is clear, then, that a need exists for a binocular or other optical instrument which is designed specifically for optimal viewing by eyeglass-wearing users. It is also clear that such an instrument should be mechanically simple and should be capable of manufacture by readily available production techniques.

SUMMARY OF THE INVENTION

The present invention is an optical instrument such as a binocular or monocular viewing telescope which is designed primarily for eyeglass-wearing users.

The instrument, hereinafter illustrated and described as a set of prismatic binoculars, is specially designed with an extended eye relief of 16 to 24 millimeters. This extended eye relief gives an eyeglass-wearing user an optimal width for a field of view that is seen through the instrument. Instead of an adjustable eyecap, a soft rubber eyeglass guard gently cushions the binocular against the user's eyeglasses and ideally positions the binocular for optimal viewing. The eyeglass guard forms a portion of a molded resilient cover which completely cushions, protects and shields the binocular housing. A diopter adjustment is located near the objective end of one of the ocular tubes to allow an eyeglass wearer to fine-tune the binocular focus to individual needs and to retain such a focus until it is desirable to readjust the focus, such as when a different user utilizes the instrument.

The eyeglass guard, in a normal position, presents an ovular generally planar surface which is substantially perpendicular to the optical viewing axis of the viewing lens of the binocular. A circular opening is concentrically positioned in front of the viewing lens. As a viewer positions his glasses against the circular opening, the resilient material is flexed inward, to protect the eyeglass lens and to block external light from reaching the eye of the user.

The binocular thus provides an eyeglass-wearing user with optimal viewing conditions in almost any environment.

OBJECTS AND ADVANTAGES OF THE INVENTION

The principal objects of the present invention are: to provide an improved binocular or other optical viewing instrument designed specifically for eyeglass-wearing users; to provide such an instrument which has an extended eye relief; to provide such an instrument which has a resilient eyeglass guard to cushion the user's eyeglasses and ideally position the binocular for optimal viewing; to provide such an instrument where the eyeglass guard provides a light-blocking seal between the eyeglass lens and the instrument viewing lens to block excessive external light from reaching the eye of the user; to provide such a system which is readily manufacturable by conventional mass production techniques; and to provide such a system that is particularly Well adapted for its intended purpose.

Other objects and advantages of this invention will become apparent from the following description taken in conjunction with the accompanying drawings wherein are set forth, by way of illustration and example, certain embodiments of this invention.

The drawings constitute a part of this specification and include exemplary embodiments of the present invention and illustrate various objects and features thereof.

BRIEF DESCRIPTION OF THE DRAWINGS

FIG. 1 is a perspective view of a glasses-on binocular in accordance with the present invention.

FIG. 2 is an enlarged end view of the glasses-on binocular with one eyeglass guard partially cut away to illustrate the construction thereof.

FIG. 3 is an enlarged and fragmentary side elevational view of one ocular barrel of the glasses-on binocular, illustrating an eyeglass lens positioned against the eyeglass guard and a user's eye for normal viewing through the binocular.

FIG. 4 is an enlarged and fragmentary cross-sectional view of the glasses-on binocular, taken along line 4—4 of FIG. 3.

FIG. 5 is a magnified and fragmentary partial view of the topmost portion of the binocular as shown in FIG. 3, showing the flexed position of the eyeglass guard in solid lines and illustrating the normal, unflexed position of the eyeglass guard in phantom lines.

DETAILED DESCRIPTION OF THE INVENTION

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Referring to FIG. 1, there is shown a glasses-on binocular instrument 1 in accordance with the present invention. The binocular 1 has left and right eyeglass guards 2 and 3, respectively, a focus adjustment knob 4, and a diopter adjustment ring 5 and an accompanying diopter scale 6 located near the objective end of the right ocular tube 7. The entire binocular instrument 1 is preferably encased in a molded resilient cover 13 to make it shock-resistant.

The left and right eyeglass guards 2 and 3, respectively, are mirror images of each other. Therefore, only the left eyeglass guard 2 will be described herein. As illustrated in FIGS. 1 and 2, the eyeglass guard 2 comprises an ovular-shaped eyeglass lens-engaging and generally planar surface 21 which tapers down to a smaller, nearly circular collar 22 which encircles the viewing lens 12 of the left ocular tube 14. The eyeglass guard 2 has an opening 11 which is off-center with respect to the ovular planar surface 21. The opening 11 is aligned with the viewing lens 12. The eyeglass guard 2 is preferably molded from soft rubber to protect the viewing lens 12 from scratching and to compress slightly to cushion the binocular 1 against a user's eyeglass lens 32. This cushioning effect is best illustrated in FIGS. 3 and 5.

Referring to FIG. 3, a user wearing eyeglasses 31 positions the eyeglass lens 32 against the lens engaging planar surface 21 of the left eyeglass guard 2. The eyeglass guard 2 has a flexible lip 23 which surrounds the circular opening 11. The lip 23 is a circular membrane of relatively thin, flexible material. An air gap 24 spaces the lip 23 from a viewing lens support 25. FIG. 2 illustrates the lip 23 partially cut away to show the depth of the lip 23 relative to the size of the opening 11. As shown in phantom lines in FIG. 5, an eyeglass facing surface of the lip 23 normally conforms to the plane of the planar surface 21. As shown in solid lines in FIG. 5, when the eyeglass lens 32 is positioned against the planar surface 21, the circular lip 23 is compressed or pushed inward so as to conform to the curved surface of the lens 32. This provides a cushioning effect for the lens 32, protecting it from scratches and sealing out external light from the top and the sides of the lens 32.

Referring again to FIG. 3, due to the exaggerated curve ordinarily found at the bottom of the lens 32, a complete seal is often not possible between the bottom of the opening 11 and the lens 32. This is the reason for the ovular shape of the eyeglass guard 2 and the off-center positioning of the opening 11. The extended reach of the bottom of the planar surface 21, due to its distinctive shape, acts to block out a large percentage of the external light which would otherwise strike the front of the lens 32 from below. The net result is that the majority of the light striking the eyeball 33 of the user comes from the ocular barrel 8 of the binocular 1. As previously mentioned, the eye relief is extended optically to give the eyeglass-wearing user an optimal wide field of view. This typically means an extended eye relief in the range of 16 to 24 millimeters is designed into the binocular 1, depending upon the magnification power of the binocular 1 and the type of eyewear employed by the user.

FIG. 4 is a cross-sectional view taken along the line 4—4 of FIG. 3 which illustrates the resilient seal between the eyeglass lens 32 and the circular lip 23 of the eyeglass guard 2.

It should be noted that the eyeglass guard 2 can be permanently affixed to the ocular barrels of the binocular I, or can be provided as an optional attachment for an existing binocular. The eyeglass guard 2 has been illustrated with a binocular instrument 1, however, it should be apparent that other optical devices in which a viewer looks through a viewing barrel, such as telescopes, periscopes, and camera sights could be similarly equipped. Furthermore, while the user has been described as wearing eyeglasses 31, it should be clear that any protective eyewear such as safety lenses or gas masks could be used, with the eye relief adjusted accordingly.

It is to be understood that while certain forms of the present invention have been illustrated and described herein, it is not to be limited to the specific forms or arrangement of parts described and shown.

What is claimed and desired to be secured by Letters Patent is as follows:

1. An optical viewing instrument adapted for a user wearing eyeglasses or the like, the instrument comprising:
   (a) at least one ocular viewing barrel terminating in a viewing lens;
   (b) at least one eyeglass guard attached to said ocular viewing barrel, said eyeglass guard comprising a collar surrounding said viewing lens, said collar being generally circular in shape at one end and tapering to a generally ovular shape at the other end with a resilient ovular-shaped eyeglass lens engaging generally planar surface enclosing said other end of said collar; and
   (c) a circular opening in said planar surface of said eyeglass guard, said circular opening being positioned in optical alignment with said viewing lens.

2. An optical viewing instrument in accordance with claim 1, wherein:
   (a) said instrument comprises a prismatic binocular instrument with two ocular viewing barrels and two eyeglass guards.

3. An optical viewing instrument in accordance with claim 2, wherein:
   (a) said binocular instrument has an extended eye relief, as compared to instruments viewed without glasses, to give an optimal field of view to said eyeglass-wearing user.

4. An optical viewing instrument in accordance with claim 3, wherein:
   (a) each of said eyeglass guards includes a flexible lip surrounding said circular opening to provide a resilient seal between said eyeglass guards and eyeglass lenses brought into contact with them.

5. An optical viewing instrument in accordance with claim 3, wherein:
   (a) each of said eyeglass guards has said circular opening off-set toward the top of said ovular planar surface, the remainder of said planar surface acting to block ambient light from reaching said eyeglass lenses.

6. An optical viewing instrument in accordance with claim 1, wherein:
   (a) said eyeglass guard includes a flexible lip surrounding said circular opening to provide a resilient seal between said eyeglass guard and an eyeglass lens brought into contact with it.

7. An optical viewing instrument in accordance with claim 6, wherein:
   (a) said eyeglass guard has said circular opening off-set toward the top of said ovular planar surface, the remainder of said planar surface acting to block ambient light from reaching said eyeglass lens.

8. An eyeglass guard attachment for an optical viewing instrument which includes at least one ocular viewing barrel terminating in a viewing lens, said eyeglass guard being attached to said ocular viewing barrel and comprising:
   (a) a collar surrounding said viewing lens, said collar being generally circular in shape at one end and tapering to a generally ovular shape at the other end with a resilient ovular-shaped eyeglass lens-engaging generally planar surface enclosing said other end of said collar; and
   (b) a circular opening in said planar surface of said eyeglass guard positioned in optical alignment with said viewing lens.

9. An eyeglass guard in accordance with claim 8, wherein:
   (a) said eyeglass guard further comprises a flexible lip surrounding said circular opening to provide a resilient seal between said eyeglass guard and an eyeglass lens brought into contact with it.

10. An eyeglass guard in accordance with claim 9, wherein:
    (a) said eyeglass guard has said circular opening off-set toward one end of said ovular-shaped planar surface, the remainder of said planar surface acting to block ambient light from reaching said eyeglass lens.

11. An eyeglass guard in accordance with claim 8, wherein:
    (a) said binocular instrument comprises a diopter adjustment ring located near the objective lens of one of said ocular viewing barrels, and a diopter gauge positioned next to said diopter adjustment ring.

12. A prismatic binocular instrument adapted for a user wearing eyeglasses or the like, the instrument comprising:
    (a) two ocular viewing barrels, each terminating in a viewing lens;
    (b) an eyeglass guard attached to each said ocular viewing barrel, said eyeglass guard comprising a collar surrounding said viewing lens, said collar being generally circular in shape at one end and tapering to a generally ovular shape at the other end with a resilient ovular-shaped eyeglass lens engaging generally planar surface enclosing said other end of said collar;
    (c) a circular opening in said planar surface of said eyeglass guard, said circular opening being off-set toward the top of said ovular-shaped planar surface and being positioned in optical alignment with said viewing lens;
    (d) the remainder of said planar surface acting to block ambient light from reaching an eyeglass lens placed into contact with said eyeglass guard;
    (e) said binocular instrument having an eye relief located to give an optimal field of view to said eyeglass-wearing user; and
    (f) a molded resilient cover completely encasing the housing of said binocular instrument to shield and protect said binocular instrument.

13. A binocular instrument in accordance with claim 11, wherein:
    (a) said binocular instrument comprises a diopter adjustment ring located near the objective lens of one of said ocular viewing barrels, and a diopter gauge positioned next to said diopter adjustment ring.

* * * * *